United States Patent
Tang

(10) Patent No.: US 11,025,314 B2
(45) Date of Patent: Jun. 1, 2021

(54) 3D MIMO BASED RADIO TRANSMISSION METHOD AND DEVICE

(71) Applicant: JRD Communication (Shenzhen) LTD., Shenzhen (CN)

(72) Inventor: Yanbo Tang, Shenzhen (CN)

(73) Assignee: JRD Communication (Shenzhen) LTD., Shenzhen (CN)

(*) Notice: Subject to any disclaimer, the term of this patent is extended or adjusted under 35 U.S.C. 154(b) by 0 days.

(21) Appl. No.: 16/619,468

(22) PCT Filed: Jun. 4, 2018

(86) PCT No.: PCT/CN2018/089838
§ 371 (c)(1),
(2) Date: Dec. 5, 2019

(87) PCT Pub. No.: WO2018/223933
PCT Pub. Date: Dec. 13, 2018

(65) Prior Publication Data
US 2020/0162136 A1  May 21, 2020

(30) Foreign Application Priority Data
Jun. 5, 2017  (CN) .......................... 201710414577.0

(51) Int. Cl.
*H04B 7/0456* (2017.01)
*H04W 76/10* (2018.01)
*H04B 7/0426* (2017.01)

(52) U.S. Cl.
CPC .......... *H04B 7/0456* (2013.01); *H04B 7/043* (2013.01); *H04W 76/10* (2018.02)

(58) Field of Classification Search
CPC ........ H04B 7/456; H04B 7/043; H04W 76/10
(Continued)

(56) References Cited

U.S. PATENT DOCUMENTS

2002/0193147 A1* 12/2002 Li .......................... H01Q 1/007
455/562.1
2013/0155847 A1* 6/2013 Li ......................... H04W 76/10
370/225
(Continued)

FOREIGN PATENT DOCUMENTS

CN   103684700   3/2014
CN   104270820   1/2015
(Continued)

OTHER PUBLICATIONS

CN103684700B Enaglish Translation (Year: 2013).*
(Continued)

Primary Examiner — Ted M Wang

(57) ABSTRACT

A 3D MIMO based radio transmission method, comprising: establishing a communication connection between a base station pre-configured with an active antenna array and a user equipment terminal, and establishing a 3D MIMO channel model; when some active antennas in the active antenna array have failed, automatically reconfiguring the active antenna array to realise redundancy; and generating a 3D pre-coded matrix through the 3D MIMO channel model, so as to form a beam forming vector having a high resolution in two dimensions and obtain a multi-user multiplexing gain.

10 Claims, 2 Drawing Sheets

(58) Field of Classification Search
USPC .......................................................... 375/267
See application file for complete search history.

(56) References Cited

U.S. PATENT DOCUMENTS

| | | | |
|---|---|---|---|
| 2015/0131750 A1* | 5/2015 | Xue ...................... | H04B 7/0452 |
| | | | 375/267 |
| 2015/0245380 A1* | 8/2015 | Li ........................ | H04W 72/082 |
| | | | 370/329 |
| 2016/0277091 A1 | 9/2016 | Kim et al. | |
| 2019/0123864 A1* | 4/2019 | Zhang .................. | H04B 7/0456 |

FOREIGN PATENT DOCUMENTS

| | | |
|---|---|---|
| CN | 107332597 | 11/2017 |
| WO | WO 2018/223933 | 12/2018 |

OTHER PUBLICATIONS

International Search Report and Written Opinion dated Sep. 5, 2018 from the International Searching Authority Re. Application No. PCT/CN2018/089838. (7 pages).

* cited by examiner

3D MIMO BASED RADIO TRANSMISSION METHOD AND DEVICE

RELATED APPLICATIONS

This application is a National Phase of PCT Patent Application No. PCT/CN2018/089838 having International filing date of Jun. 4, 2018, which claims the benefit of priority of Chinese Patent Application No. 201710414577.0 filed on Jun. 5, 2017. The contents of the above applications are all incorporated by reference as if fully set forth herein it their entirety.

FIELD AND BACKGROUND OF THE INVENTION

The present invention relates to a mobile communication technique, and more particularly to a wireless transmission method and a wireless transmission device based on 3D MIMO.

As the rapid development of the mobile internet, the data traffic grows extremely fast and thus the current wireless network needs to adjust to meet the data transmission requirement. For the most popular communication systems (LTE or LTE-A), increasing the system capacity and reducing interferences are still the most important development goals. With the success of the AAS (active antenna system) in 3GPP, the 3D MIMO, as a new wireless technology, receives more and more attentions. The multiple-input multiple-output (MIMO) technique means that multiple receiving antennas and multiple transmitting antennas are respectively used in the receiving end and the transmitting end.

In other words, the signals could be transmitted through the multiple receiving antennas and multiple transmitting antennas and there the transmission quality is improved. It could sufficiently utilize the space resources, utilize multiple antennas to receive/transmit signals, and improve the system channel capacity without increasing the bandwidth resources and antenna transmission power and thus is deemed as a next generation core wireless transmission technique.

IMT-Advanced system is a mobile system better than IMT-2000. IMT-Advanced system could increasing the system coverage and capacity and could provide a wide communication service: utilizing mobile and fixed networks to support an increasing demand of advanced mobile communication services based on packet transmission.

3D MIMO technique, as a core technology evolved from IMT-Advance system, is more efficient and flexible to improve the system performance and user experiences. In the 4G standard, the core technologies, including MU-MIMO and CoMP, are all based on the 2D MIMO. 2D MIMO means that in the base station, the beamforming vector designed according to the user channel information has a good definition in a specific direction but has a bad or even a zero definition in the direction orthogonal to the specific direction. The characteristic of the 2D MIMO is determined by the arrangement of the wireless transmission system. For example, the antenna units in the base station could be arranged in a linear arrangement. Further, each of the antenna units of the transmitting end or the receiving end may not be flexibly controlled. These factors may influence the characteristic. Although the MU-MIMO and CoMP techniques could enormously raise the system throughput and cell edge throughput. However, 2D MIMO system does not sufficiently explore the potential multi-user diversity gain and interference suppression between cells and users in a multi-antenna system. 3D MIMO system could raise the performance of the wireless transmission system because of its powerful function.

The advantages of the 3D MIMO are as below: 1. The interference suppression: the base station could form a beamforming vector having a narrower lobe and better directionality through designing 3D pre-coding matrix to raise the user effective channel gain, suppress interference between users and cells, and raise the system performance. While meeting the demand of quality of service (QoS), the 3D MIMO could enormously reduce the emitting power of the transmitting end. This reduces the power consumption and thus 3D MIMO is also a green communication technique. 2. The system multiplexing gain: the 3D MIMO technique is adopted to design the 3D pre-coding matrix such that a beamforming vector having a high resolution in 2D directions. This could realize 2D cell divisions. In the multi-user scenario, the solution could provide services to more users such that the system could obtain a better multi-user multiplexing gain and improve the user experience and system performance. Further, if the 3D MIMO technique is adopted in a multi-cell coordination system, a higher-dimensional coordination transmission and resource allocation could be realized to raise the system performance. The 3D MIMO technique could utilize the services and controls provided by the base station or other honeycomb network infrastructure to realize multi-user MIMO, multi-cell, high dimensional coordination transmission. This could improve the network arrangement flexibility, increase the coverage, raise the network capacity and transmission efficiency, improve the system robustness, and reduce the power consumption of the base station and the terminals.

The main issue of the conventional wireless transmission system is how to have a better interference suppression and system multiplexing gain.

SUMMARY OF THE INVENTION

One objective of an embodiment of the present invention is to provide a wireless transmission method and a wireless transmission device based on 3D MIMO. The beamforming vector having a high resolution in 2D directions could be formed through generating a 3D pre-coding matrix. This could realize 2D cell divisions. In the multi-user scenario, the solution could provide services to more users such that the system could obtain a better multi-user multiplexing gain and improve the user experience and system performance. Further, if the 3D MIMO technique is adopted in a multi-cell coordination system, a higher-dimensional coordination transmission and resource allocation could be realized to raise the system performance. The 3D MIMO technique could utilize the services and controls provided by the base station or other honeycomb network infrastructure to realize multi-user MIMO, multi-cell, high dimensional coordination transmission. This could improve the network arrangement flexibility, increase the coverage, raise the network capacity and transmission efficiency, improve the system robustness, and reduce the power consumption of the base station and the terminals.

According to a first aspect of, a wireless transmission method based on three dimensional (3D) multiple-input multiple-output (MIMO) is disclosed.

The wireless transmission method comprises:

establishing a communication connection between a base station having an active antenna array and a user equipment terminal and establishing a 3D MIMO channel model;

when a part of the active antenna array is out of order, automatically rearranging the active antenna array to achieve redundancy;

generating a 3D pre-coded matrix through the 3D MIMO channel model to form a beamforming vector in a 2 dimensional direction such that a multi-user multiplexing gain is obtained.

According to the present invention, the active antenna array comprises a plurality of active antennas, each of the active antennas comprises an antenna unit, a feeder unit, and a radio frequency unit.

According to an embodiment of the present invention, the base station generates the 3D pre-coded matrix to form the beamforming vector to reduce an emitting power of the base station and the user equipment terminal.

According to an embodiment of the present invention, the base station generates the 3D pre-coded matrix through the 3D MIMO channel model to form the beamforming vector in the 2 dimensional direction in order to implement a virtual cell division in a 2 dimension.

According to a second aspect of the present invention, a wireless transmission device based on a 3D MIMO is disclosed. The wireless transmission device comprises: a power module;

a base station, configured to establish a 3D MIMO channel model by performing a measurement on a 3D MIMO channel between the base station and a user equipment terminal; the base station has an active antenna array, each of the active antenna array comprises an antenna unit, a feeder unit, and a RF unit;

a processor;

a storage device, electrically connected to the processor, configured to store a program for the processor to execute;

the program comprising: a base band processing module, configured to meet a high speed communication demand;

an RF module, configured to perform a sampling filtering function, a synchronization control function, and a RF daughter board control function; and a pre-coding module, configured to work as a core of a signal transmission end of the base station to perform a pre-coding;

wherein the active antenna array, the base band processing module, the RF module, and the power module exchange data via a PCIe port or an Ethernet interface.

According to an embodiment of the present invention, the wireless transmission device comprises two base stations, each having an 8*8 active antenna array, the base stations have 128 active antennas; wherein the user terminal comprises a 2*1 active antenna array having a same type of active antennas as those of the base station.

According to an embodiment of the present invention, the base band processing module comprises at least one base band board, comprising a plurality of high-end DSP chips and FPGA chips, exchanging data through high speed serial interface.

According to an embodiment of the present invention, a working bandwidth of a single active antenna is 20 MHz and a maximum of the single active antenna is 5 W.

According to an embodiment of the present invention, the DSP chip is configured to perform a channel coding, an interweaving/speed matching, modulation, and serial/parallel switching function; and wherein after a pre-coding function is performed in the FPGA chip and an OFDM modulation and a physical framing function are formed in the DSP chip, physically-framed data are sent to the RF module through a Gigabit Ethernet interface.

According to an embodiment of the present invention, the RF module performs a sampling filtering function and a synchronization control function in the FPGA chip, and the FPGA chip and the DSP chip together perform an RF daughter board control function.

According to a third aspect of the present invention, a wireless transmission method based on three dimensional (3D) multiple-input multiple-output (MIMO) is disclosed. The wireless transmission method comprises:

establishing a communication connection between a base station having an active antenna array and a user equipment terminal;

establishing a 3D MIMO channel model comprising an elevation angle of a vertical dimension;

generating a 3D pre-coded matrix through the 3D MIMO channel model to form a beamforming vector in a 2 dimensional direction such that a multi-user multiplexing gain is obtained.

According to an embodiment of the present invention, the active antenna array comprises multiple active antennas, each of the active antennas comprises an antenna unit, a feeder unit and an RF unit; when a part of the active antenna array is out of order, automatically rearranging the active antenna array to achieve redundancy.

In contrast to the conventional art, a wireless transmission device based on a 3D MIMO is disclosed. The wireless transmission device comprises: a power module; a base station, configured to establish a 3D MIMO channel model by performing a measurement on a 3D MIMO channel between the base station and a user equipment terminal; wherein the base station has an active antenna array, each of the active antenna array comprises an antenna unit, a feeder unit, and a RF unit; a processor; and a storage device, electrically connected to the processor, configured to store a program for the processor to execute; the program comprising: a base band processing module, configured to meet a high speed communication demand; an RF module, configured to perform a sampling filtering function, a synchronization control function, and a RF daughter board control function; and a pre-coding module, configured to work as a core of a signal transmission end of the base station to perform a pre-coding; wherein the active antenna array, the base band processing module, the RF module, and the power module exchange data via a PCIe port or an Ethernet interface. The present invention forms a beamforming vector having a high resolution in 2D directions through generating a 3D pre-coding matrix. This could realize 2D cell divisions. In the multi-user scenario, the solution could provide services to more users such that the system could obtain a better multi-user multiplexing gain and improve the user experience and system performance. Further, if the 3D MIMO technique is adopted in a multi-cell coordination system, a higher-dimensional coordination transmission and resource allocation could be realized to raise the system performance. The 3D MIMO technique could utilize the services and controls provided by the base station or other honeycomb network infrastructure to realize multi-user MIMO, multi-cell, high dimensional coordination transmission. This could improve the network arrangement flexibility, increase the coverage, raise the network capacity and transmission efficiency, improve the system robustness, and reduce the power consumption of the base station and the terminals.

DESCRIPTION OF SPECIFIC EMBODIMENTS OF THE INVENTION

Specifically, the terminologies in the embodiments of the present invention are merely for describing the purpose of the certain embodiment, but not to limit the invention. Examples and the appended claims be implemented in the present invention requires the use of the singular form of the book "an", "the" and "the" are intended to include most forms unless the context clearly dictates otherwise. It should also be understood that the terminology used herein that "and/or" means and includes any or all possible combinations of one or more of the associated listed items.

Figure 1:
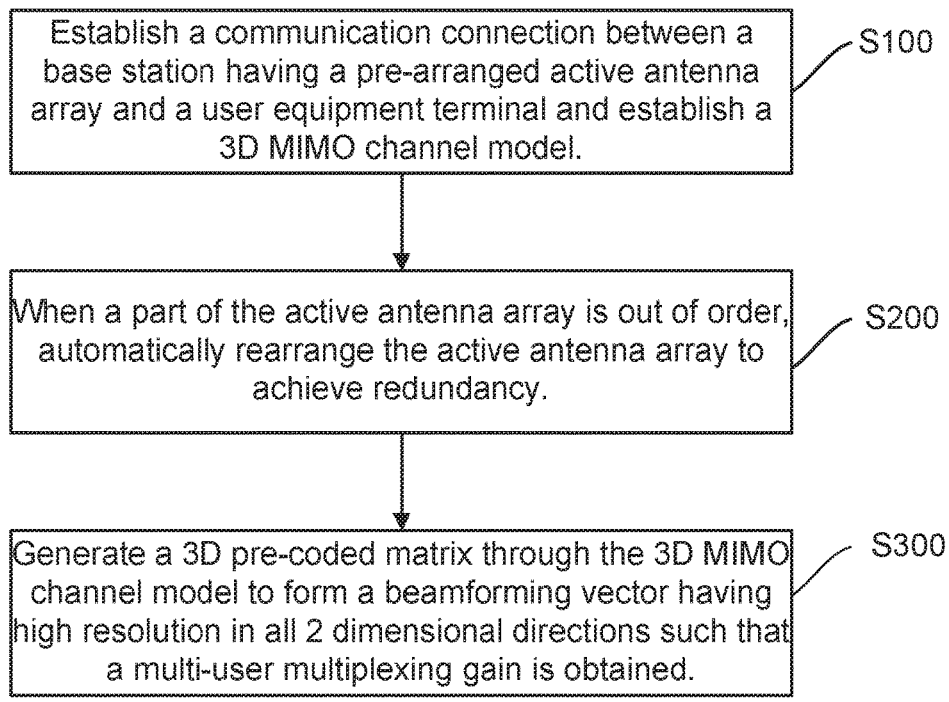
FIG. 1 is a flow chart of a wireless transmission method based on 3D MIMO according a preferred embodiment of the present invention.

Please refer to FIG. 1. FIG. 1 is a flow chart of a wireless transmission method based on 3D MIMO according a preferred embodiment of the present invention. The wireless transmission method comprises following steps:

Step S100: establishing a communication connection between a base station having an active antenna array and a user equipment terminal and establishing a 3D MIMO channel model.

Specifically, the active antenna array comprises a plurality of active antennas. Each of the active antennas comprises an antenna unit, a feeder unit, and a radio frequency unit.

The system composed of the active circuit and each of radiation unit in the antenna matrix or sub-matrix channels is the active antenna array, which is used to receive or transmit electromagnetic waves. Each of the active antenna is not only used to transmit/receive electromagnetic signals, but is used as a part of the circuit to perform functions of harmonic, polarization and power amplifying. As the progress of the optical technique, spatial power synthesis technique, and MMIC technology, the active antenna could possibly work in micrometer band or millimeter band and thus could have a future in radar, communication, or electronic competition technologies.

3D MIMO channel modeling is to add a vertical angle based on the conventional MIMO model such that the generated channel transmission parameters could meet the actual communication scenario. As the progress of the wireless communication, the demands of the system throughput and efficiency are higher. MIMO is deeply researched because of its capacity and becomes a core technology in a next generation communication. The MIMO technology could sufficiently utilize the spatial characteristic and raise the system capacity without increasing the emitting power and bandwidth. In the MIMO technology, there is a close relationship between the wireless communication channel and the increase of the capacity. The conventional MIMO channel model is basically focused on the 2D expansion and the related calculation and statistic on the EM transmission parameter are focused on the horizontal angles.

In order to accurately simulate the actual MIMO channel environment, the present invention provides a 3D MIMO channel model, which adds a vertical angle on a conventional MIMO model such that the generated channel transmission parameters could meet the actual communication scenario. The method of 3D MIMO model is based on a random model of geometric statistics. This is similar to the channel model of the SCM channel of 3GPP or WINNER II in Europe.

In this embodiment, the 3D MIMO model is expanded based on the foundation of WINNER II channel. First, the statistics operation is performed on the parameters of the channel and then large-scale parameters and small-scale parameters are randomly generated according to the statistics. WINNER II channel model has the statistics of measurements and possibility density equations on the horizontal angles of various scenarios but does not have any statistics of elevation angles. Therefore, the present invention makes an assumption that the elevation angles follow a predetermined distribution and makes the 3D MIMO incorporating the elevation angles more accurate. At the same time, because the response of the antenna needs to be reevaluated, the present invention provides an algorithm to calculate according to a 3D pattern, which is simulated according to the horizontal pattern and vertical pattern of the antenna such that the antenna matrix model of the 3D MIMO is the same as that of the WINNER II, which adopts three coordinates to represent the relationship between the transmission direction of EM wave and the antenna. On the basis of 3D MIMO model, the present invention performs a simulation on the 3D MIMO channels based on the aforementioned model and calculates the time-domain decay characteristic, envelope, relevance, and capacity to compare the results of the channel characteristics under different parameters. Furthermore, the present invention ensures the reliability of the model according to the analysis of the theoretical values. At the same time, the present invention analyzes the pre-coding performances under different channel models and considers three primary linear pro-coding mechanisms: zero-forcing algorithm, block diagonal algorithm, and maximization SLNR algorithm. The simulation results make it clear that different pre-coding performances under different channels have certain differences in between if other conditions are the same. This illustrates that the channel model has great impacts on the system simulation and thus reconfirms the necessity of 3D MIMO model.

Step S200: when a part of the active antenna array is out of order, automatically rearranging the active antenna array to achieve redundancy.

Specifically, a single active antenna has a working bandwidth of 20 MHz and could work at a frequency from 700M to 2.6 GHz. The maximum transmission power of the active antenna is 5 W. The combination of multiple active antennas constitutes a wideband active antenna array. The active antenna array could work at multiple different frequency bands and could improve 30% network capacity and complete a maximum network coverage with minimum power consumption through vertical beamforming. In addition, because each of the active antennas is completely independent, when a part of the active antennas is out of order, the antenna matrix could automatically be rearranged to achieve redundancy (Here, the redundancy represents adding a repetitive part and the purpose of it is to have a backup for a part of the system to improve the system safety. This is widely implemented in the information communication system.) Because all the active antenna arrays are connected to the centralized baseband to process via CPRI (common public radio interface) port, the ICIC (inter cell interference coordination), a technique used to suppress the interference of cells when the cells utilize the same frequency to form the network, could completely used by a neighbor cell to improve the signal to noise ratio.

Step S300: generating a 3D pre-coded matrix through the 3D MIMO channel model to form a beamforming vector having high resolution in all 2 dimensional directions such that a multi-user multiplexing gain is obtained.

Specifically, the base station could form a beamforming vector having a narrower lobe and better directionality through designing 3D pre-coding matrix to raise the user effective channel gain, suppress interference between users and cells, and raise the system performance. While meeting the demand of quality of service (QoS), the 3D MIMO could enormously reduce the emitting power of the transmitting end. This reduces the power consumption and thus 3D MIMO is also a green communication technique.

Or, the 3D pre-coding matrix could be generated according to the 3D MIMO channel model such that a beamforming vector having a high resolution in 2D directions. This could realize 2D cell divisions. In the multi-user scenario, the solution could provide services to more users such that the system could obtain a better multi-user multiplexing gain, realize a multi-dimensional coordination transmission, multi-dimensional resource allocations, increase the coverage, the network capacity and transmission efficiency, and improve the system robustness. If the 3D MIMO technique is adopted in a multi-cell coordination system, a higher-dimensional coordination transmission and resource allocation could be realized to raise the system performance.

The multiplexing gain means dividing the data to be transmitted into several data flows and then transmit the data using different antennas to increase the transmission efficiency. The 3D MIMO technique could utilize the services and controls provided by the base station or other honeycomb network infrastructure to realize multi-user MIMO, multi-cell, high dimensional coordination transmission. This could improve the network arrangement flexibility, increase the coverage, raise the network capacity and transmission efficiency, improve the system robustness, and reduce the power consumption of the base station and the terminals.

The present invention further provides a wireless transmission device based on 3D MIMO.

Figure 2:
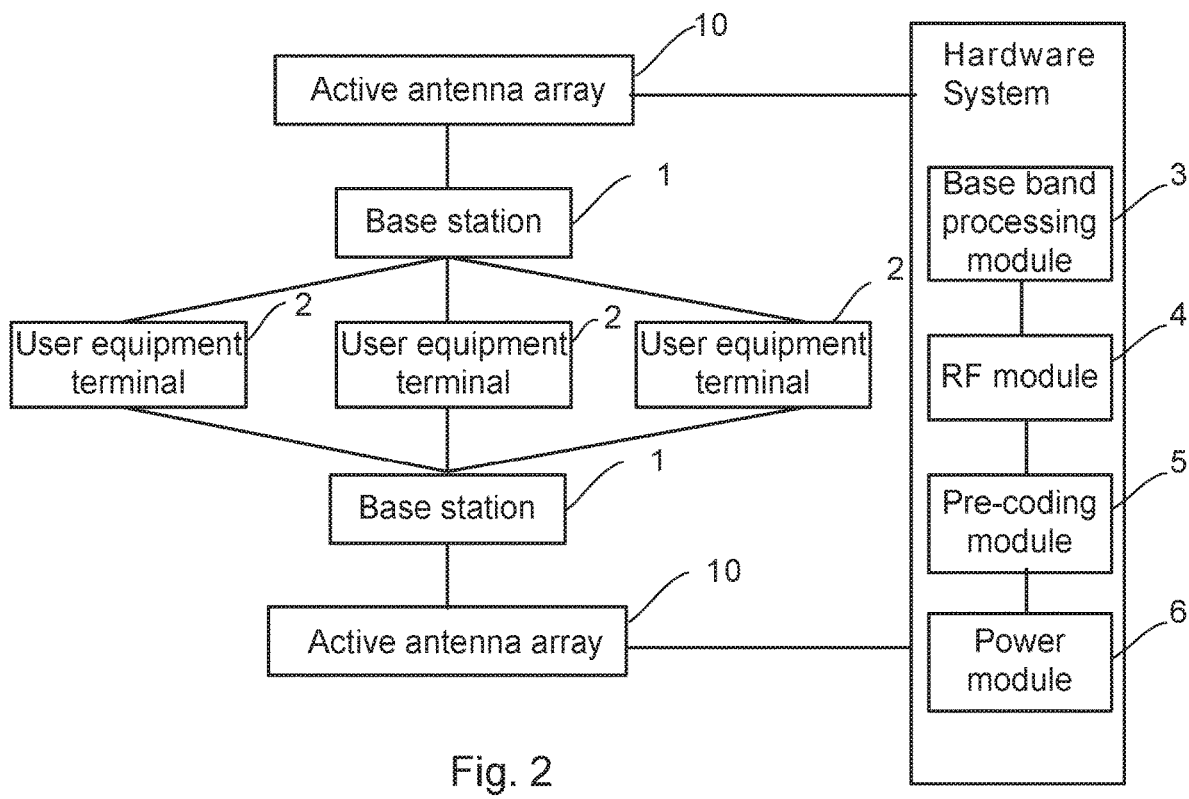
FIG. 2 is a functional block diagram of a wireless transmission device based on 3D MIMO according a preferred embodiment of the present invention.

As shown in FIG. 2, the wireless transmission device comprises: two base stations 1 having an active antenna array 10, three user equipment terminals 2 and a 3D MIMO channel model established according to the measurements of the 3D MIMO channel between the base stations and the user equipment terminals 2. Please note, the numbers of the base station and the user equipment are not a limitation of the present invention and could be adjusted by different demands.

Figure 3:
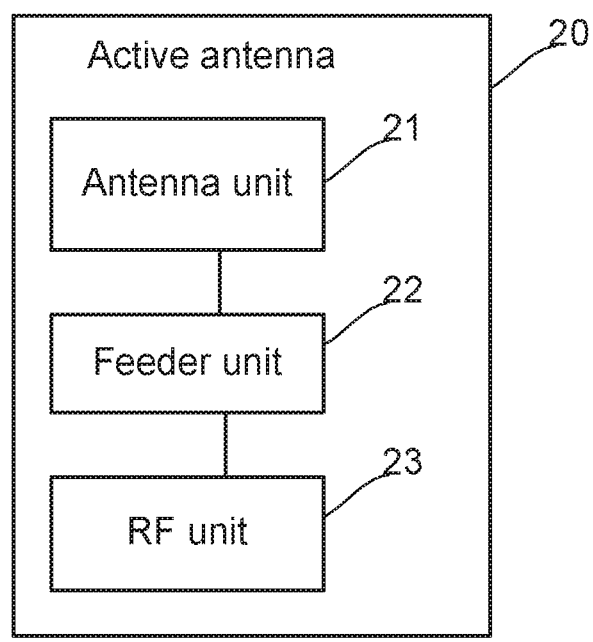
FIG. 3 is a diagram of a structure of active antennas in the wireless transmission device based on 3D MIMO according a preferred embodiment of the present invention.

As shown in FIG. 3, the active antenna array 10 comprises multiple active antennas 20. The active antenna 20 comprises an antenna unit 21, a feeder unit 22 and an RF unit 23 supporting long term evolution (LTE) standard.

The wireless transmission device further comprises a processor and a memory, electrically connected to the processor.

The memory stores a computer program for the processor to execute. The computer program comprises:

a base band processing module 3 meeting a high speed communication demand;

an RF module 4, configured to perform a sampling filtering function, a synchronization control function, and a RF daughter board control function; and a pre-coding module 5, configured to work as a core of a signal transmission end of the base station to perform a pre-coding.

The active antenna array 10, the base band processing module 3, the RF module 4, and the power module 6 all comply with the uTCA structure design principle and the above modules exchange data via a PCI-express (PCIe) interface or a Gigabit Ethernet interface. Here, the PCI-express is the newest bus and interface standard. PCIe belongs to high-speed peer-to-pear dual-channel wide-band-width transmission and the equipments connected to the PCIe interface could have an independent channel bandwidth instead of sharing bus bandwidth. The PCIe mainly supports the active power management, error reports, peer-to-peer reliability transmission, hot plugging, and QOS. In addition, the term "Gigabit" is a data storage unit and often represented by a symbol Gbit or Gb (where 1 Gb=1,000,000,000 bits).

Each of the base stations 1 has an 8*8 active antenna array. The base station 1 has 128 active antennas. Each of the user terminals 2 uses the same type of active antennas as those of the base station 1. Each of the user terminals 2 comprises a 2*1 active antenna array and has 6 active antennas.

The base band processing module 3 could satisfy the complexities and instant demands of all algorithms. The base band processing module 3 could comprise 1-2 base band boards according to the actual demands. The base band processing module 3 comprises a plurality of high-end DSP chips and FPGA chips, exchanging data through high speed serial interface. The processing ability of a single board could reach 300000 MMAC. The base band board provides multiple 12.5 Gps high-speed serial ports and multiple Gigabits Ethernet networks to meet high-speed communication demands.

The working bandwidth of a single active antenna is 20 MHz and a maximum of the single active antenna is 5 W.

The DSP chip is used to perform a channel coding, an interweaving/speed matching, modulation, and serial/parallel switching function. After a pre-coding function is performed in the FPGA chip and an OFDM modulation and a physical framing function are formed in the DSP chip, physically-framed data are sent to the RF module 4 through a Gigabit Ethernet interface.

The RF module 4 performs a sampling filtering function and a synchronization control function in the FPGA chip, and the FPGA chip and the DSP chip together perform an RF daughter board control function.

In the transmitting direction, the channel coding, the interweaving/speed matching, the modulation, and the serial/parallel switching function are implemented by the DSP. Considering the processing capability of the DSP and preventing frequency data exchange between chips, the modules are integrated as a whole in a DSP. The pre-coding module 5 is regarded as a core module in the transmitting end and has a high processing complexity. Therefore, the pre-coding module 5 is implemented in the FPGA. After the pre-coding process, the OFGM and the physical framing function are implemented by the DSP. The framed data are transmitted to the RF module 4 through the Gigabit Ethernet interface 4. The Gigabit Ethernet interface 4 performs the sampling filtering function the synchronization control function, and the RF daughter board control function. Here, the RF daughter board control function is implemented by the FPGA in coordination with the DSP and the other functions are implemented by the FPGA.

In the receiving direction, the main functions of the RF module 4 of the active antenna comprise: RF daughter board control, automatic gain control, synchronization control, timing synchronization, digital down conversion, down sampling filtering functions. The timing synchronization module is realized in the DSP. The RF daughter board control module is realized by DSP in coordination with FPGA. The other modules are realized in FPGA. The OFDM modulation module and the physical framing module are realized in the DSP. The demodulation and deinterlacing modules are also realized in the DSP. The channel decoding module is realized in FPGA.

In the actual implementation, in order to reduce the development expense and shorten the development period, the present invention utilizes an unified hardware system to realize eNB (ENB series, a plug-in software program for revising 3D pictures of games and having improving the picture quality, could improve user experience by revising a rendering equation and application additivity effect called by the games) via different newest Xilinx ZYNQ SOC (FPGA logic and DSP software). Regarding the software, the present invention utilizes the eNG and UE having 5G basic characteristics to develop 3D MIMO function and corresponding business flow transmission/receiving functions.

In the 3D MIMO communication, the eNB has the core control function. In addition to normal functions of a base station, the eNB should have the following characteristics:
 having a new type of 3D MIMO antenna;
 efficiently revising the vertical direction of signal transmission;
 new type of interference control between cells;
 wireless resource management of the 3D MIMO network;
 control of 3D MIMO communication interference coordination and coordination operations; and
 providing a pre-coding module.

The eNB further provides a control and business terminal, which could be implemented as a laptop or a desktop computer, which connects to a baseband module via the Ethernet interface. In the control and business terminal, a control software program for the development examination platform is required as a human-machine interface of a prototype platform to complete the arrange, control, and monitor the equipment conditions of the prototype platform and to collect the performance data such that the examination and testing tasks could be easily done. Further, the control and business terminal could be used as a business original server, such as a data source or a video source.

The present invention further provides a wireless transmission method based on the 3D MIMO.

The method comprises: establishing a communication connection between a base station having an active antenna array and a user equipment terminal;
 establishing a 3D MIMO channel model comprising an elevation angle of a vertical dimension;
 generating a 3D pre-coded matrix through the 3D MIMO channel model to form a beamforming vector in a 2 dimensional direction such that a multi-user multiplexing gain is obtained.

In the wireless transmission method based on 3D MIMO, the active antenna array comprises multiple active antennas. Each of the active antennas comprises an antenna unit, a feeder unit and an RF unit. When a part of the active antenna array is out of order, automatically rearranging the active antenna array to achieve redundancy.

In sum, a wireless transmission method and a wireless transmission device based on a 3D MIMO are disclosed. The present invention forms a beamforming vector having a high resolution in 2D directions through generating a 3D pre-coding matrix. This could realize 2D cell divisions. In the multi-user scenario, the solution could provide services to more users such that the system could obtain a better multi-user multiplexing gain and improve the user experience and system performance. Further, if the 3D MIMO technique is adopted in a multi-cell coordination system, a higher-dimensional coordination transmission and resource allocation could be realized to raise the system performance. The 3D MIMO technique could utilize the services and controls provided by the base station or other honeycomb network infrastructure to realize multi-user MIMO, multi-cell, high dimensional coordination transmission. This could improve the network arrangement flexibility, increase the coverage, raise the network capacity and transmission efficiency, improve the system robustness, and reduce the power consumption of the base station and the terminals.

It should be understood that the various parts of the present disclosure may be implemented by using hardware, software, firmware, or combinations thereof. In the above embodiment, the plurality of blocks or methods may be implemented by using software or firmware stored in the memory and executed by a suitable instruction execution system.

Above are embodiments of the present invention, which does not limit the scope of the present invention. Any modifications, equivalent replacements or improvements within the spirit and principles of the embodiment described above should be covered by the protected scope of the invention.

What is claimed is:

1. A wireless transmission method based on three dimensional (3D) multiple-input multiple-output (MIMO), the wireless transmission method comprising:
 establishing a communication connection between a base station having an active antenna array and a user equipment terminal and establishing a 3D MIMO channel model;
 when a part of the active antenna array is out of order, automatically rearranging the active antenna array to achieve redundancy;
 generating, with the base station, a 3D pre-coded matrix through the 3D MIMO channel model to form a beamforming vector in a 2 dimensional direction in order to implement a virtual cell division in a 2 dimension such that a multi-user multiplexing gain is obtained.

2. The wireless transmission method of claim 1, wherein the active antenna array comprises a plurality of active antennas, each of the active antennas comprises an antenna unit, a feeder unit, and a radio frequency unit.

3. The wireless transmission method of claim 1, wherein the base station generates the 3D pre-coded matrix to form the beamforming vector to reduce an emitting power of the base station and the user equipment terminal.

4. The wireless transmission method of claim 1, wherein the active antenna array is an 8*8 active antenna array, and the user terminal comprises a 2*1 active antenna array having a same type of active antennas as those of the base station.

5. The wireless transmission method of claim 4, wherein a working bandwidth of a single active antenna is 20 MHz and a maximum of the single active antenna is 5 W.

6. A wireless transmission method based on three dimensional (3D) multiple-input multiple-output (MIMO), the wireless transmission method comprising:
 establishing a communication connection between a base station having an active antenna array and a user equipment terminal;
 establishing a 3D MIMO channel model comprising an elevation angle of a vertical dimension;
 generating, with the base station, a 3D pre-coded matrix through the 3D MIMO channel model to form a beamforming vector in a 2 dimensional direction to reduce an emitting power of the base station and the user equipment terminal such that a multi-user multiplexing gain is obtained.

7. The wireless transmission method of claim 6, wherein the active antenna array comprises multiple active antennas, each of the active antennas comprises an antenna unit, a feeder unit and an RF unit; when a part of the active antenna array is out of order, automatically rearranging the active antenna array to achieve redundancy.

8. The wireless transmission method of claim 6, wherein the base station generates the 3D pre-coded matrix through the 3D MIMO channel model to form the beamforming vector in the 2 dimensional direction in order to implement a virtual cell division in a 2 dimension.

9. The wireless transmission method of claim 6, wherein the active antenna array is an 8*8 active antenna array, and the user terminal comprises a 2*1 active antenna array having a same type of active antennas as those of the base station.

10. The wireless transmission method of claim 9, wherein a working bandwidth of a single active antenna is 20 MHz and a maximum of the single active antenna is 5 W.

* * * * *